(12) United States Patent
Wang et al.

(10) Patent No.: US 11,425,331 B1
(45) Date of Patent: Aug. 23, 2022

(54) VIDEO-IMAGE-INTERPOLATION APPARATUS AND METHOD FOR ADAPTIVE MOTION-COMPENSATED FRAME INTERPOLATION

(71) Applicant: Terawins, Inc., New Taipei (TW)

(72) Inventors: Yu-Kuang Wang, New Taipei (TW); Wen-Yi Huang, New Taipei (TW); Pei-Kai Hsu, New Taipei (TW)

(73) Assignee: TERAWINS, INC., New Taipei (TW)

( * ) Notice: Subject to any disclaimer, the term of this patent is extended or adjusted under 35 U.S.C. 154(b) by 0 days.

(21) Appl. No.: 17/523,269

(22) Filed: Nov. 10, 2021

(30) Foreign Application Priority Data

Apr. 21, 2021 (TW) .................................. 110114246

(51) Int. Cl.
*H04N 7/01* (2006.01)
*H04N 5/272* (2006.01)

(52) U.S. Cl.
CPC ............. *H04N 7/014* (2013.01); *H04N 5/272* (2013.01); *H04N 7/0127* (2013.01)

(58) Field of Classification Search
CPC ........ H04N 7/014; H04N 7/0127; H04N 7/01; H04N 7/0135; H04N 7/0117; H04N 5/272
USPC ................ 348/441, 448, 451, 452, 458, 459
See application file for complete search history.

(56) References Cited

U.S. PATENT DOCUMENTS

| 8,830,403 | B1 * | 9/2014 | Kametani | ............ | H04N 7/0127 348/441 |
| 2014/0176794 | A1 * | 6/2014 | Fujishiro | ............... | G06T 3/4007 348/441 |

FOREIGN PATENT DOCUMENTS

CN 103155547 A 6/2013

* cited by examiner

*Primary Examiner* — Sherrie Hsia
(74) *Attorney, Agent, or Firm* — Muncy, Geissler, Olds & Lowe, P.C.

(57) ABSTRACT

A method of region-based video-image interpolation is provided, which includes the following steps: respectively dividing each image and its subsequent image in an input video signal into first regions and second regions to obtain first regional images and second regional images; performing a motion-compensated frame-interpolation process on the first regional image and the second regional image in the same position in each image and its subsequent image to obtain an interpolated regional image; performing a frame-rate-conversion process on reference images and the interpolated regional images of each first region according to an original frame rate of each first region and a display frame rate of an output video signal to obtain a regional output image of each first region; and superimposing the regional output image generated at each output timestamp by each motion-compensated frame-interpolation circuit to generate an output image of the output video signal.

10 Claims, 10 Drawing Sheets

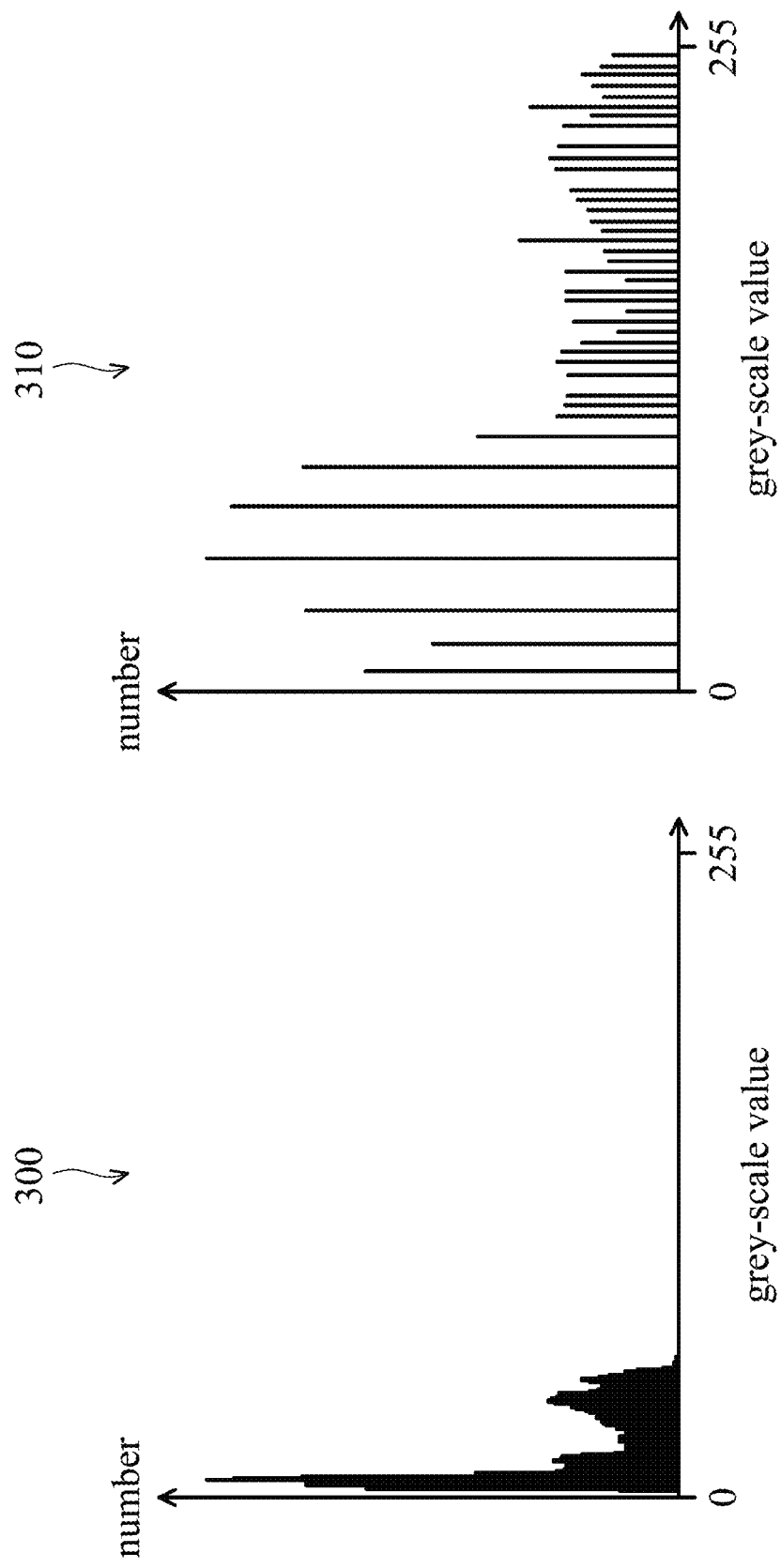

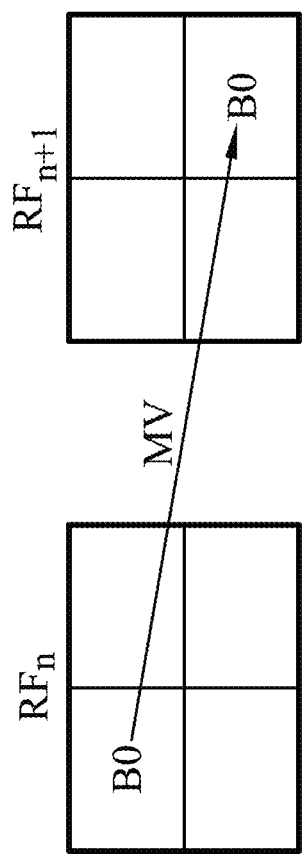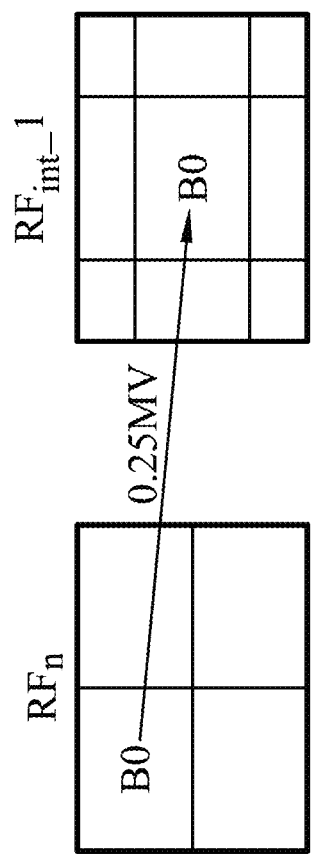
FIG. 5C
FIG. 5D

VIDEO-IMAGE-INTERPOLATION APPARATUS AND METHOD FOR ADAPTIVE MOTION-COMPENSATED FRAME INTERPOLATION

CROSS REFERENCE TO RELATED APPLICATIONS

This Application claims priority of Taiwan Patent Application No. 110114246, filed on Apr. 21, 2021, the entirety of which is incorporated by reference herein.

BACKGROUND OF THE INVENTION

Field of the Invention

The present invention relates to video processing, and in particular, to a video-image-interpolation apparatus and a method of adaptive motion-compensated frame interpolation.

Description of the Related Art

When conventional video-image-interpolation apparatuses perform video-frame-rate conversion, motion estimation and motion compensation (MEMC) are performed on the entire frame. However, as video applications become more and more widespread, two videos with different frame rates (e.g., 25 Hz and 30 Hz) may be played simultaneously on a computer, or the display frame rate of the graphical user interface and the original frame rate of an input video signal may be different. For example, the display frame rate of the graphical user interface may be 60 Hz, and the original frame rate may be 24 Hz. In this case, the video frame-rate conversion using MEMC performed by a conventional video-image interpolation apparatus will produce errors, such as jitter.

Accordingly, there is demand for a region-based video-image-interpolation apparatus and a method of region-based video-image interpolation to solve the aforementioned problem.

BRIEF SUMMARY OF THE INVENTION

In an exemplary embodiment, a region-based video-image-interpolation apparatus is provided. The region-based video-image-interpolation apparatus includes an image-region-dividing circuit, a plurality of video-image-interpolation circuits, and a regional-image-synthesizing circuit. The image-region-dividing circuit respectively divides each image and its subsequent image in an input video signal into a plurality of first regions and a plurality of second regions to obtain a plurality of first regional images corresponding to each image, and to obtain a plurality of second regional images corresponding to the subsequent image. Each video-image-interpolation circuit performs a motion-compensated frame-interpolation process on the first regional image and the second regional image in the same position in each image and its subsequent image to obtain one or more interpolated regional images. Each video-image-interpolation circuit performs a frame-rate-conversion process on reference images and the one or more interpolated regional images of each first region according to an original frame rate of a reference image sequence of each first region and a display frame rate of an output video signal displayed by the region-based video-image-interpolation apparatus to obtain a regional output image of each first region. The regional-image-synthesizing circuit superimposes the regional output image generated at each output timestamp by each motion-compensated frame-interpolation circuit to generate an output image of the output video signal.

In some embodiments, the image-region-dividing circuit obtains position information of each first region in each image of the input video signal from an electronic device in which the region-based video-image-interpolation apparatus is disposed, and the first regions comprise a graphical user interface and one or more video-display regions.

In some embodiments, the image-region-dividing circuit uses an edge-detection technique to detect frames in each image and its subsequent image in the input video signal, and determines position information for each first region in each image of the input video signal, and the first regions comprise a graphical user interface and one or more video-display regions.

In some embodiments, each video-image-interpolation circuit performs at least three image-layering processes to divide each first regional image into a first image layer and a first subtitle layer, and to divide each second regional image into a second image layer and a second subtitle layer. Each video-image-interpolation circuit obtains a reference image-layer sequence and a reference subtitle-layer sequence according to the first image layer and the first subtitle layer of each image and the second image layer and the second subtitle layer of the subsequent image that are generated in each image-layering process. Each video-image-interpolation circuit performs motion estimation respectively on the reference image-layer sequence and the reference subtitle-layer sequence that are generated in each image-layering process. Each video-image-interpolation circuit adaptively determines a first motion vector of each block in each reference-image layer of the reference image-layer sequence and a second motion vector of each block in each reference-subtitle layer of the reference subtitle-layer sequence that are generated by the motion-estimation having the smallest motion error. Each video-image-interpolation circuit performs a motion-compensation process, according to the first motion vector of each block in each reference-image layer and the second motion vector of each block in each reference-subtitle layer, to generate one or more interpolated image-layer images and one or more interpolated subtitle-layer images.

In some embodiments, each video-image-interpolation circuit superimposes the reference image-layer sequence and the reference subtitle-layer sequence to generate a plurality of reference images, and superimposes the one or more interpolated image-layer images and the one or more interpolated subtitle-layer images to generate one or more interpolated images. Each video-image-interpolation circuit performs a frame-rate-conversion process on the reference images and the interpolated images of each first region according to the original frame rate of the reference image sequence of each first region and the display frame rate of the output video signal to obtain the regional output image of each first region.

In another exemplary embodiment, a method of region-based video-image interpolation is provided. The method includes the following steps: respectively dividing each image and its subsequent image in an input video signal into a plurality of first regions and a plurality of second regions to obtain a plurality of first regional images corresponding to each image, and to obtain a plurality of second regional images corresponding to the subsequent image; performing a motion-compensated frame-interpolation process on the first regional image and the second regional image in the same position in each image and its subsequent image to obtain one or more interpolated regional images; performing a frame-rate-conversion process on reference images and the one or more interpolated regional images of each first region according to an original frame rate of a reference image sequence of each first region and a display frame rate of an output video signal displayed by the region-based video-image-interpolation apparatus to obtain a regional output image of each first region; and superimposing the regional output image generated at each output timestamp by each motion-compensated frame-interpolation circuit to generate an output image of the output video signal.

In some embodiments, the method further includes the following steps: obtaining position information of each first region in each image of the input video signal from an electronic device in which the region-based video-image-interpolation apparatus is disposed, and the first regions comprise a graphical user interface and one or more video-display regions.

In some embodiments, the method further includes the following steps: using an edge-detection technique to detect frames in each image and its subsequent image in the input video signal; and determining the position information of each first region in each image of the input video signal, and the first regions comprise a graphical user interface and one or more video-display regions.

In some embodiments, the method further includes the following steps: performing at least three image-layering processes to divide each first regional image into a first image layer and a first subtitle layer, and to divide each second regional image into a second image layer and a second subtitle layer; obtaining a reference image-layer sequence and a reference subtitle-layer sequence according to the first image layer and the first subtitle layer of each image and the second image layer and the second subtitle layer of the subsequent image that are generated in each image-layering process; performing motion estimation respectively on the reference image-layer sequence and the reference subtitle-layer sequence that are generated in each image-layering process; adaptively determining a first motion vector of each block in each reference-image layer of the reference image-layer sequence and a second motion vector of each block in each reference-subtitle layer of the reference subtitle-layer sequence that are generated by the motion-estimation having the smallest motion error; and performing a motion-compensation process, according to the first motion vector of each block in each reference-image layer and the second motion vector of each block in each reference-subtitle layer, to generate one or more interpolated image-layer images and one or more interpolated subtitle-layer images.

In some embodiments, the method further includes the following steps: superimposing the reference image-layer sequence and the reference subtitle-layer sequence to generate a plurality of reference images, and superimposing the one or more interpolated image-layer images and the one or more interpolated subtitle-layer images to generate one or more interpolated images; and performing a frame-rate-conversion process on the reference images and the interpolated images of each first region according to the original frame rate of the reference image sequence of each first region and the display frame rate of the output video signal to obtain the regional output image of each first region.

BRIEF DESCRIPTION OF THE DRAWINGS

The present invention can be more fully understood by reading the subsequent detailed description and examples with references made to the accompanying drawings, wherein:

FIG. 3A is a diagram of a histogram of a grey-scale image in accordance with an embodiment of the invention;

FIG. 3B is a diagram of an equalized histogram of the grey-scale image in accordance with the embodiment of FIG. 3A;

FIG. 5C is a diagram showing a motion vector of a specific block from an image to a next image in accordance with an embodiment of the invention;

FIG. 5D is a diagram showing a motion vector of a specific block from an image to an interpolated image in accordance with an embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

The following description is presented to enable one of ordinary skill in the art to make and use the invention, and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

Figure 1:
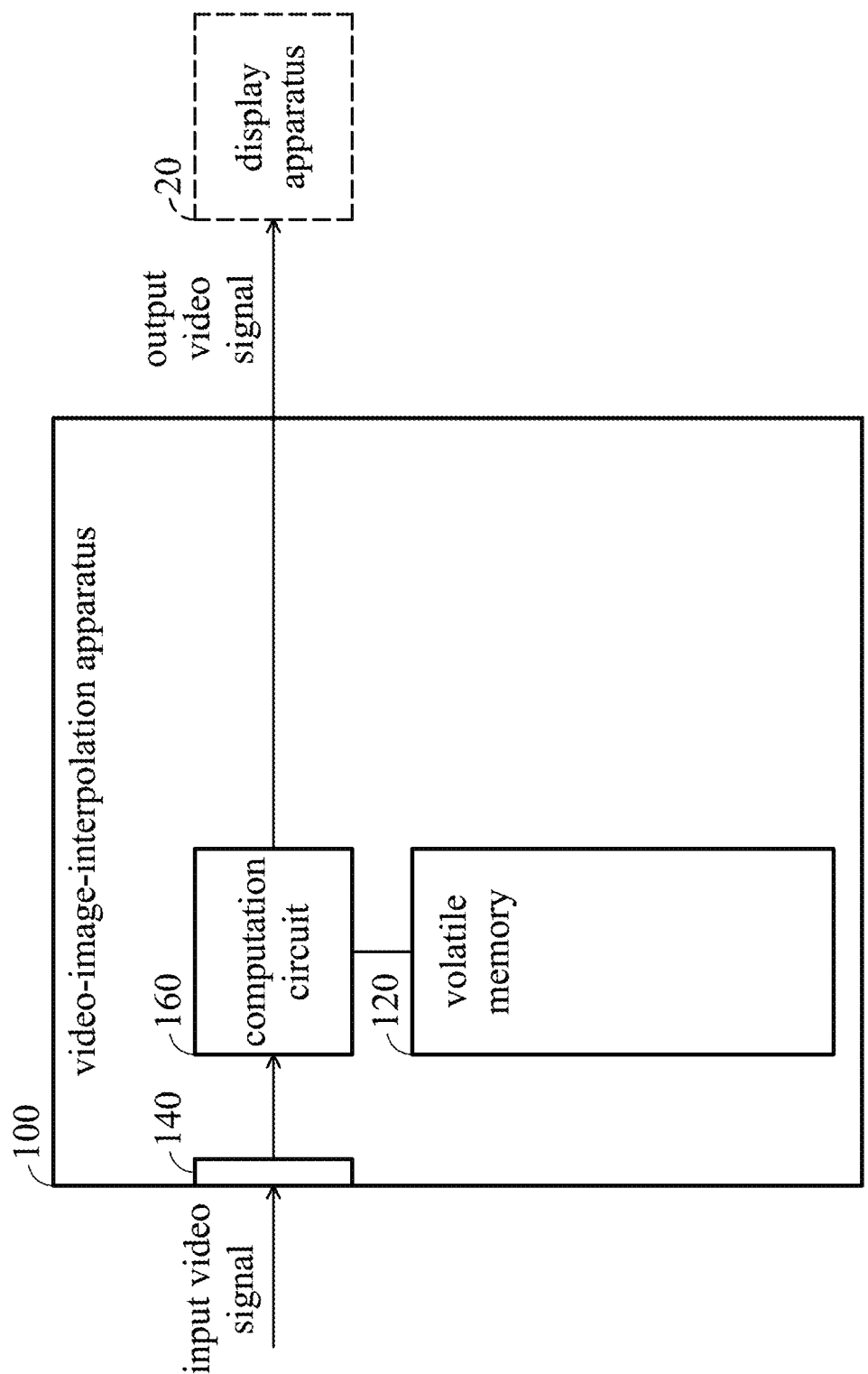
FIG. 1 is a diagram of a region-based video-image-interpolation apparatus in accordance with an embodiment of the invention.

FIG. 1 is a diagram of a region-based video-image-interpolation apparatus in accordance with an embodiment of the invention.

The region-based video-image-interpolation apparatus 100 can be disposed in a television, a computer monitor, a projector, a smartphone, a tablet PC, a laptop computer, etc., to perform motion compensated-frame interpolation to perform frame rate conversion. In an embodiment, the region-based video-image-interpolation apparatus 100 may include a computation circuit 160, a volatile-memory 120, and a transmission interface 140. The region-based video-image-interpolation apparatus 100 may receive an input video signal via the transmission interface 140, wherein the input video signal has an input frame rate. The computation circuit 160 may perform motion-compensated frame interpolation to convert the input video signal into an output video signal, and displays the output video signal on a display apparatus 20 at a display frame rate, wherein the display frame rate is higher than or equal to the input frame rate. The display apparatus 20, for example, may be a television, a computer monitor, a projector, a smartphone, a tablet PC, or display screen of a laptop computer, but the invention is not limited thereto.

In some embodiments, the computation circuit 160 may be an application-specific integrated circuit (ASIC) or a logic circuit having equivalent function.

The volatile memory 120 may be implemented by a dynamic random access memory (DRAM) or a static random access memory (SRAM), but the invention is not limited thereto. The transmission interface 140, for example, may be an HDMI (high-definition multimedia interface) interface, a DisplayPort interface, or a VGA (video graphics array) interface, but the invention is not limited thereto. The volatile memory 120 may be used as an image buffer that stores images to be output to the display apparatus 20.

In an embodiment, the input video signal may include one or more display contents with one or more original frame rates, such as 24 Hz for a movie, 60 Hz for graphical user interfaces, 25 or 30 Hz for TV shows. In addition, an external device may superimpose subtitles at the corresponding time point on top of each original image in a video sequence to obtain each image in the input video signal, so one or more images in the input video sequence of the input video signal may contain subtitles, wherein the subtitles may include fixed subtitles and/or mobile subtitles (e.g., a "bullet screen" or closing credits).

Figure 2A:
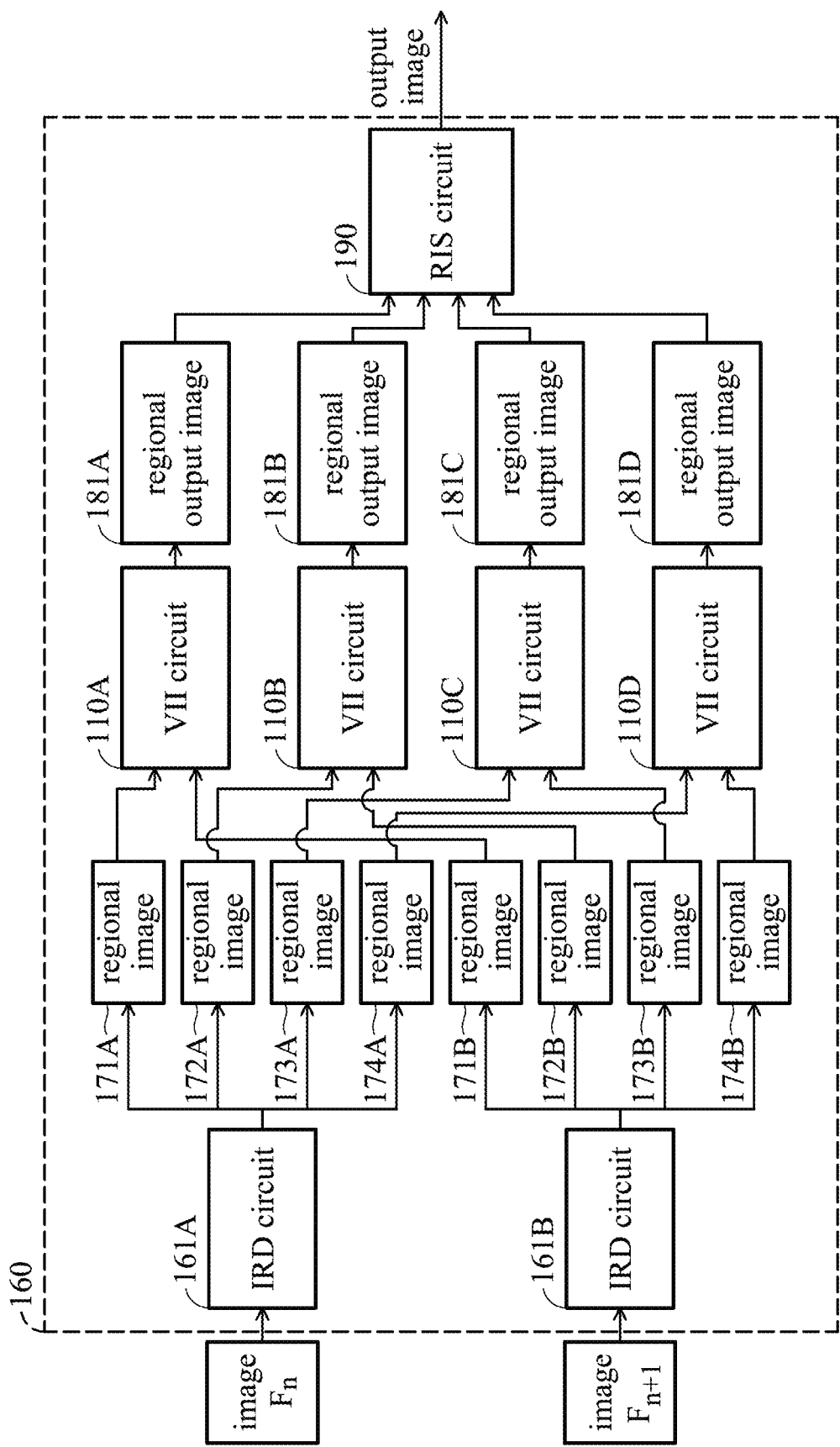
FIG. 2A is a diagram of the computation circuit in accordance with the embodiment of FIG. 1.

FIG. 2A is a diagram of the computation circuit in accordance with the embodiment of FIG. 1.

The computation circuit 160 may include image-region-dividing (IRD) circuits 161A-161B, video-image-interpolation (VII) circuits 110A-110D, a regional-image-synthesizing (RIS) circuit 190, and a display-control circuit 192. Images Fn and Fn+1 may indicate the RGB images at time points n and n+1 in the input image sequence.

For example, images Fn and Fn+1 may include multiple windows or regions, and content in each region of the input video signal may have different original frame rate, and thus the image-region-dividing circuits 161A-161B may perform an image-region-dividing process to respectively divide images Fn and Fn+1 into a plurality of regions. For example, image Fn may be divided into regional images 171A-174A, and images Fn+1 may be divided into regional images 171B-174B. As shown in FIG. 2C, image 270 may be image Fn, and the image-region-dividing circuit 161A may divide image 270 into regions A1-A4 to obtain regional images 271-274.

In an embodiment, the image-region-dividing circuits 161A-161B can obtain position information of different regions in the input video signal from the system on chip (SoC) or central processing unit (CPU) of the electronic device in which the region-based video-image-interpolation apparatus 100 is disposed, such as the position information of one or more video display regions and the graphical user interface. Accordingly, the image-region-dividing circuits 161A-161B may respectively divide images Fn and Fn+1 into regional images 171A-174A and 171B-174B according to the obtained position information.

In another embodiment, the image-region-dividing circuit 161A-161B may detect frames in each image and its subsequent image in the input video signal using known image-edge-detection techniques in the art of the present invention, and determine the position information of the graphical user interface and the video display regions according to the detected frames. Accordingly, the image-region-dividing circuits 161A-161B may respectively divide images Fn and Fn+1 into regional images 171A-174A and 171B-174B according to the position information.

In some embodiments, the video-image-interpolation circuits 110A-1101D may perform motion estimation on the regional images in the same position in images Fn and Fn+1, and perform motion compensation to calculate one or more interpolated regional images between the regional images in the same position in images Fn and Fn+1.

Figure 2B:
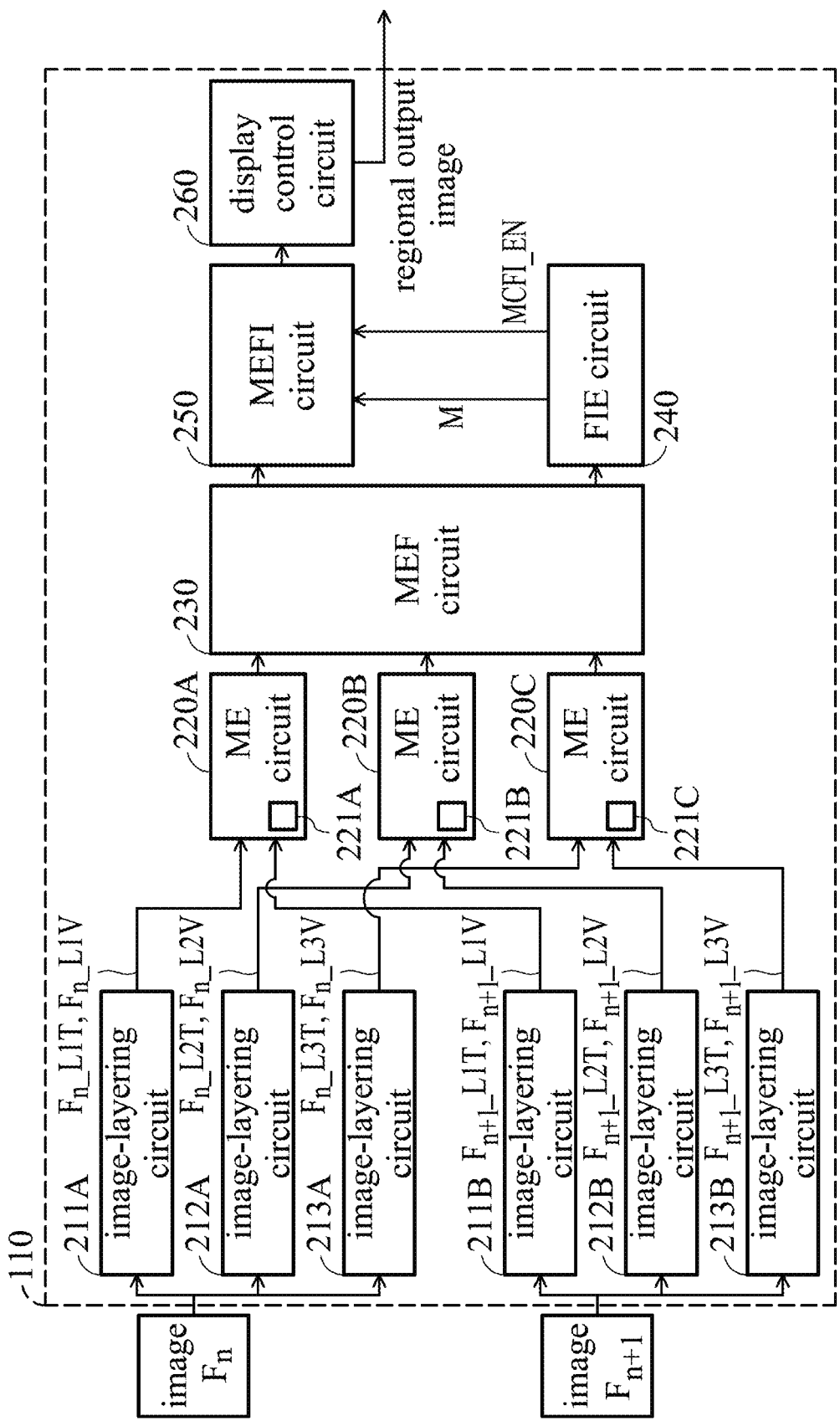
FIG. 2B is a diagram of the motion-compensated frame-interpolation circuit in accordance with the embodiment of FIG. 2A.
Figure 2C:
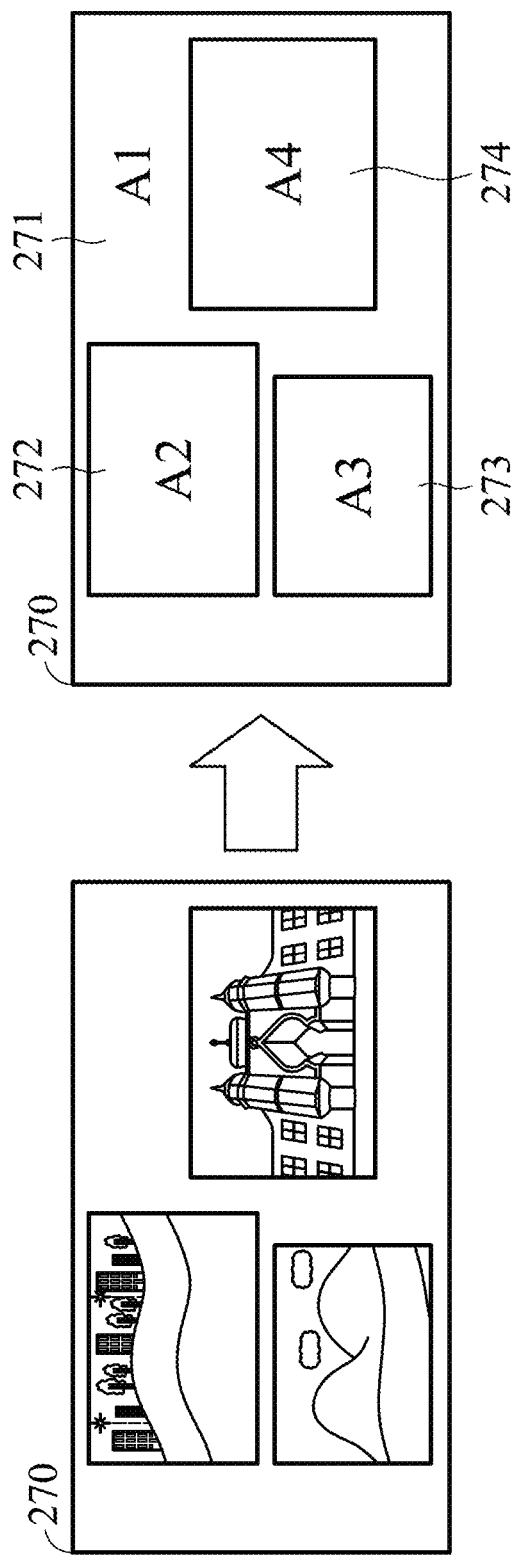
FIG. 2C is a diagram of dividing an image into a plurality of regional images in accordance with an embodiment of the invention.

In some other embodiments, the video-image-interpolation circuits 110A-110D can be implemented by the video-image-interpolation circuit 110 in FIG. 2B, which is capable of performing adaptive motion-compensated frame interpolation. For example, the video-image-interpolation circuit 110 may divide each image in the input video signal into a subtitle layer and an image layer using different image-layering methods, and adaptively select the motion-estimation result with the smallest motion error for motion compensation.

Figure 2D:
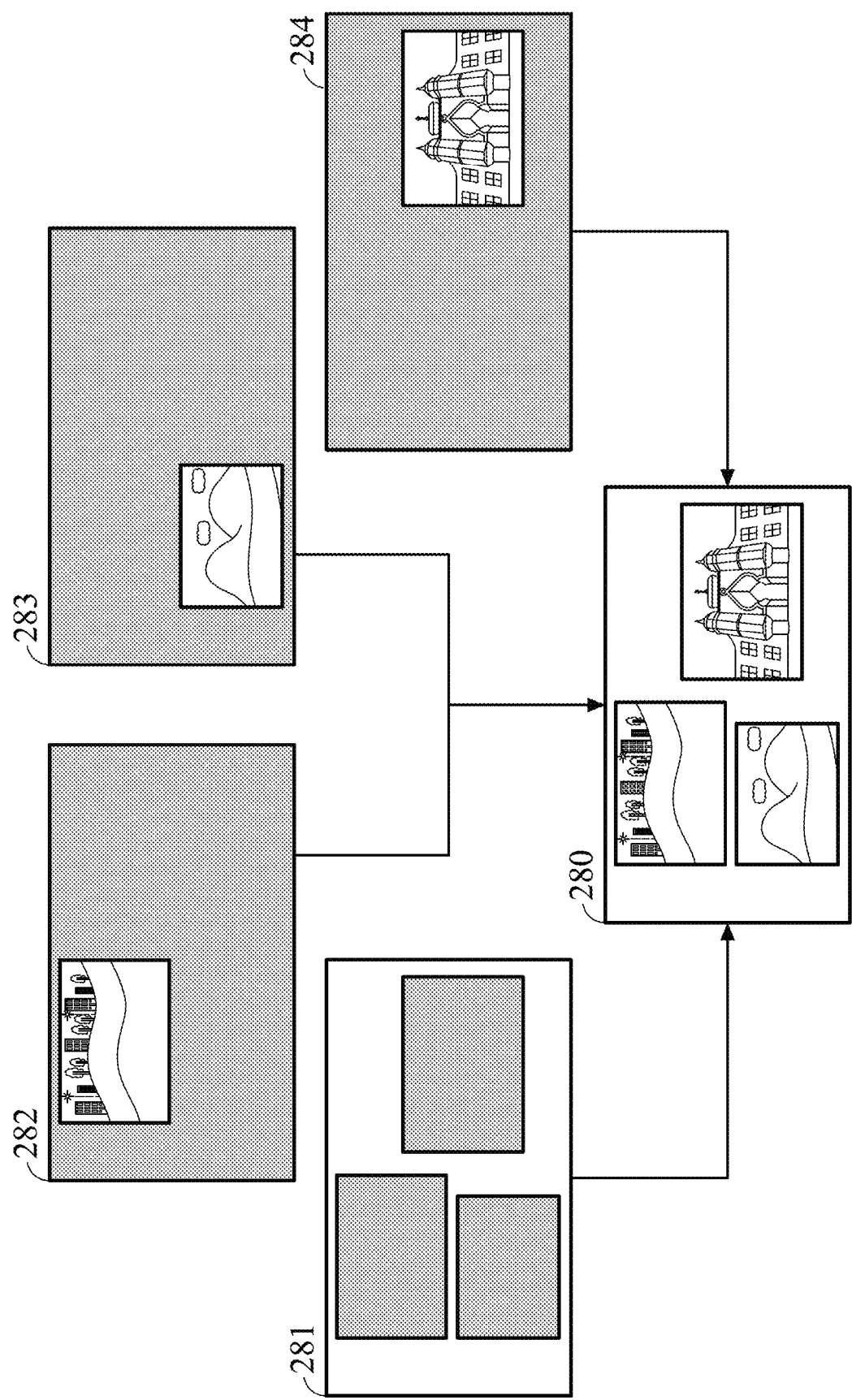
FIG. 2D is a diagram of superimposing a plurality of regional images to generate an output image in accordance with an embodiment of the invention.

The regional-image-synthesizing circuit 190 may superimpose the regional output images generated by the vide-image-interpolation circuits 110A-110D at each output timestamp to generate the output image of the output video signal. For example, each of the video-image-interpolation 110A-110D may generate a corresponding regional output image at each output timestamp, and thus the regional-image-synthesizing circuit 190 can superimpose each regional output image at the same output timestamp to obtain the output image corresponding to the output timestamp. For example, if the video-image-interpolation circuits 110A-110D respectively generates regional output images 281-284, the regional-image-synthesizing circuit 190 may superimpose the regional output images 281-284 to generate an output image 280, as shown in FIG. 2D.

FIG. 2B is a diagram of the video-image-interpolation circuit in accordance with an embodiment of FIG. 2A.

Each of the video-image-interpolation circuits 110A-110D in FIG. 2A can be implemented by the video-image-interpolation circuit 110 in FIG. 2B. As depicted in FIG. 2B, the video-image-interpolation circuit 110 may include image-layering circuits 211A-211B, 212A-212B, 213A-213B, motion-estimation (ME) circuits 220A-220C, a motion-estimation-filtering (MEF) circuit 230, a frame-interpolation-evaluation (FIE) circuit 240, a motion-compensated frame-interpolation (MCFI) circuit 250, and a display-control circuit 260.

The computation circuit 160 may include image-layering circuits 221A-221B, 212A-212B, and 213A-213B, motion-estimation (ME) circuits 220A-220C, a motion-estimation-filtering (MEF) circuit 230, a frame-interpolation-evaluation (FIE) circuit 240, a motion-compensated-frame-interpolation (MCFI) circuit 250, and a display-control circuit 260.

Images Fn and Fn+1 may indicate the RGB images at time points n and n+1 in the input image sequence. For example, the image-layering circuits 221A-221B, 212A-212B, and 213A-213B may use different image-segmentation algorithms to divide images Fn and Fn+1 respectively into an image layer and a subtitle layer.

In an embodiment, the image-layering circuit 211A and 211B may separate the input image (e.g., an RGB image) into a subtitle layer and an image layer using a fixed brightness-layering method. For example, the image-layering circuits 211A and 211B may perform RGB to YUV conversion on each pixel of the input image to obtain a grey-scale image, wherein the grey-scale value of each pixel in the grey-scale image can be calculated using equation (1):

$$Y=0.30R+0.59G+0.11B \qquad (1)$$

wherein R, G, and B indicate the brightness value of the red, green, and blue sub-pixels of each pixel in the input image. If the brightness values of the red, green, and blue sub-pixels are between 0 and 255, the grey-scale value Y is also between 0 and 255. The image-layering circuit 211A and 211B may set a brightness-threshold ratio (e.g., between 0 and 1) to filter out the subtitle layer from the input image, wherein the bright-threshold ratio is an adjustable parameter. For example, if the brightness-threshold ratio is 0.95, the image-layering circuit 211A and 211B may calculate the corresponding brightness threshold is 255*0.95, which is approximately equal to 242. Accordingly, the image-layering circuits 211A and 211B may label the pixels in the grey-scale image having grey-scale values greater than or equal to the brightness threshold as the corresponding pixels of the subtitle layer, and label the pixels in the grey-scale image having grey-scale values less than the brightness threshold as the corresponding pixels of the image layer. Accordingly, the image-layering circuits 211A and 211B can separate the subtitle layer and the image layer in the input image according to the labeled pixels in the grey-scale image.

Figure 4:
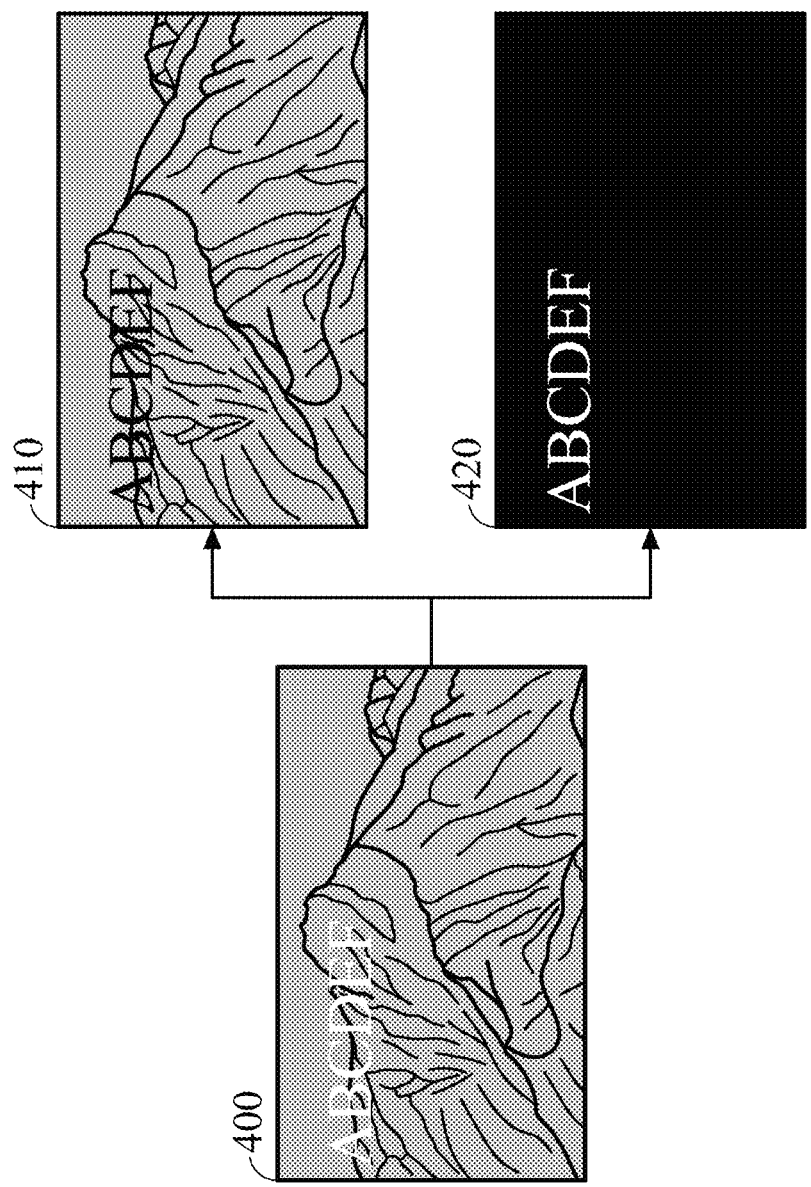
FIG. 4 is a diagram of dividing an image into an image layer and a subtitle layer in accordance with an embodiment of the invention.

For example, image Fn passes through the image-layering circuit 211A to obtain the subtitle layer Fn_L1T and the image layer Fn_L1V, and the image Fn+1 passes through the image-layering circuit 211B to obtain the subtitle layer Fn+1_L1T and the image layer Fn+1_L1V. The image 400 shown in FIG. 4 is a diagram of the image Fn, and the image 400 passes through the image-layering circuit 211A to obtain images 410 and 420, wherein the images 410 and 420 are the subtitle layer Fn_L1T and image layer Fn_L1V. It should be noted that the image portion other than the subtitle layer Fn_L1T in image 410 is all black (i.e., brightness value=0), and the pixels in image 420 corresponding to the subtitle layer Fn_L1T are all black.

In an embodiment, the image-layering circuits 212A and 212B may separate the input image (e.g., an RGB image) into a subtitle layer and an image layer using a dynamic brightness-layering method. For example, the image-layering circuits 212A and 212B may perform RGB to YUV conversion on each pixel of the input image to obtain a grey-scale image using equation (1). Afterwards, the image-layering circuits 212A and 212B may calculate statistics on the grey-scale image to obtain a histogram 300 of the grey-scale image, as shown in FIG. 3A.

The image-layering circuits 212A and 212B may perform equalization on the histogram 300 to obtain an equalized histogram 310, as shown in FIG. 3B. Assuming that the grey-scale value is between 0 and 255, if the statistical values in the histogram 300 are more concentrated in a certain area (e.g., high brightness, low brightness, or intermediate brightness), after equalization processing, the statistical values in the equalized histogram 310 can be more evenly distributed between 0 and 255.

The image-layering circuits 212A and 212B may set a first filtering-threshold ratio to use the equalized histogram 310 to separate the input image into the subtitle layer and image layer, wherein the first filtering-threshold ratio is an adjustable parameter. For example, assuming that the first filtering-threshold ratio is 0.95, the image-layering circuits 212A and 212B will label the pixels greater than or equal to the first filtering-threshold ratio in the equalized histogram 310 as the subtitle layer, and label the pixels less than the first filtering-threshold ratio in the equalized histogram 310 as the image layer. That is, the image-layering circuits 212A and 212B will label the first 5% of the pixels in the equalized histogram 310 as the subtitle layer, and label the pixels within 95% of the equalized histogram 310 as the image layer. Accordingly, the image-layering circuits 212A and 212B can separate the input image into the subtitle layer and image layer according to the subtitle-layer labels and image-layer labels of the pixels in the grey-scale image.

In other words, the image Fn passes through the image-layering circuit 212A to obtain the subtitle layer Fn_L2T and the image layer Fn_L2V, and the image Fn+1 passes through the image-layering circuit 212B to obtain the subtitle layer Fn+1_L2T and the image layer Fn+1_L2V. It should be noted that the image-layering circuits 212A and 212B use the first filtering-threshold ratio to layer the pixels in the equalized histogram 310. No matter whether the overall brightness of the grey-scale image is brighter or darker, both the image-layering circuits 212A and 212B can filter out relatively bright pixels and label them as the subtitle layer, and label the relatively dark pixels as the image layer.

In an embodiment, the image-layering circuits 213A and 213B may separate the input image (e.g., an RGB image) into a subtitle layer and an image layer using a block-contrast-layering method. For example, the image-layering circuits 213A and 213B may perform RGB to YUV conversion on each pixel of the input image to obtain a grey-scale image using equation (1). Afterwards, the image-layering circuits 213A and 213B may divide the grey-scale image into N*N blocks, and calculate histogram statistics on each block, where N is an adjustable parameter (e.g., a positive integer greater than or equal to 2) such as 50, 100, etc., but the invention is not limited thereto.

The image-layering circuits 213A and 213B may perform equalization on the histogram corresponding to each block to obtain the equalized histogram corresponding to each block. Assuming that the grey-scale value is between 0 and 255, if the statistical values in the histogram corresponding to each block are more concentrated in a certain area (e.g., high brightness, low brightness, or intermediate brightness), after equalization processing, the statistical values in the equalized histogram corresponding to each block can be more evenly distributed between 0 and 255.

The image-layering circuits 213A and 213B may set a second filtering-threshold ratio to use the equalized histogram corresponding to each block to separate the input image into the subtitle layer and the image layer, wherein the second filtering-threshold ratio is an adjustable parameter. For example, assuming that the second filtering-threshold ratio is 0.8, the image-layering circuits 213A and 213B may label the pixels greater than or equal to the second filtering-threshold ratio in the equalized histogram corresponding to each block as the subtitle layer, and label the pixels less than the second filtering-threshold ratio in the equalized histogram corresponding to each block as the image layer. That is, the image-layering circuits 213A and 213B may label the top 20% pixels in the equalized histogram corresponding to each block as the subtitle layer, and label the pixels within 80% of the equalized histogram corresponding to each block as the image layer. Accordingly, the image-layering circuits 213A and 213B can separate each block in the input image into the subtitle layer and the image layer according to the subtitle-layer labels and image-layer labels of the pixels in each block.

In other words, the image Fn passes through the image-layering circuit 213A to obtain the subtitle layer Fn_L3T and the image layer Fn_L3V, and the image Fn+1 passes through the image-layering circuit 213B to obtain the subtitle layer Fn+1_L3T and the image layer Fn+1_L3V.

It should be noted that the number of image-layering circuits is not limited to 3 types (e.g., may be 3 or more types), and the layers obtained by separating images Fn and Fn+1 are also not limited to the image layer and subtitle layer, which depends on the image-segmentation algorithm actually used by each image-layering circuit. In addition, subtitles usually use relatively high-brightness text. Therefore, the image-layering circuits 211A-211B, 212A-212B, and 213A-213B can use this feature to separate the respective image layers and subtitle layers from the images Fn and Fn+1.

In an embodiment, the inputs of the motion-estimation circuits 220A-220C may include the image-layers and subtitle layers obtained by separating the images Fn and Fn+1. For example, the input of the motion-estimation circuit 220A may include the subtitle layer Fn_L1T and image layer Fn_L1V generated by the image-layering circuit 211A, and include the subtitle layer Fn+1_L1T and image layer Fn+1_L1V generated by the image-layering circuit 211B. The motion-estimation circuit 220A may perform motion estimation on the subtitle layers Fn_L1T and Fn+1_L1T, and perform motion estimation on the image layers Fn_L1V and Fn+1_L1V.

Before performing motion estimation on the subtitle layers and image layers, frame-rate-detection circuits 221A-221C of the motion-estimation circuits 220A-220C may detect the original frame rate of content in the input video signal. For example, the region-based video-image-interpolation apparatus 100 may receive the input video signal from a host (not shown) via the transmission interface 140. If the transmission interface 140 is the HDMI interface, the input frame rate of the input video signal is generally at 60 Hz. However, the host may perform frame interpolation on a certain movie film (i.e., having an original frame rate at 24 Hz) to meet the frame rate of 60 Hz. For example, the host may perform the frame interpolation for the 24 Hz movie film through a 3:2 repeated-frame method to convert a movie film at 24 Hz into a video signal at 60 Hz.

Although the region-based video-image-interpolation apparatus 100 can know the input frame rate of the input video signal, the region-based video-image-interpolation apparatus 100 cannot directly know the original frame rate of the content of the input video signal. When the region-based video-image-interpolation apparatus 100 is used to generate an output video signal at a display frame rate higher than 60 Hz, if the region-based video-image-interpolation apparatus 100 directly uses the images of the input video signal to perform motion-compensated frame interpolation, the generated output video signal will cause obvious picture jitters. The frame-rate detection-circuits 221A-221C can use the volatile memory 120 to store consecutive images of the subtitle layer and image layer to determine the original frame rate of the content of the input video signal, such as 24 Hz, 25 Hz, 30 Hz, 60 Hz, and so on, but the invention is not limited thereto. The frame-rate-detection circuits 221A-221C can use known frame-rate detection technologies in the art of the present invention to obtain a reference subtitle-layer sequence and a reference image-layer sequence (i.e., the subtitle-layer sequence and image-layer sequence of the original image sequence of the content of the input video signal) from the subtitle-layer sequence and image-layer sequence generated by each image-layer circuit.

When the frame-rate-detection circuit 221A has obtained the reference subtitle-layer sequence (e.g., the sequence of reference subtitle layer RFn_L1T) and the reference image-layer sequence (e.g., the sequence of reference image layer RFn_L1V), the motion-estimation circuit 220A may respectively divide the reference subtitle layer RFn_L1T and reference image layer RFn_L1V into N*N blocks, where N is an adjustable parameter (e.g., a positive integer greater than or equal to 2), such as 50, 100, etc., but the invention is not limited thereto.

In an embodiment, the motion-estimation circuits 220A-220C may perform motion estimation using the block-matching algorithm. For example, the motion-estimation circuit 220A compares the each block in the reference image layer RFn_L1V with each co-located block in the reference image layer RFn+1_L1V with rotation and offset of the surrounding n pixels. For example, the motion-estimation circuit 220A may rotate and move each block in the reference image layer RFn_L1V by plus or minus 15 degrees to find the corresponding block with the smallest difference in position and angle in the reference image layer RFn+1_L1V to calculate a first motion vector corresponding to each block in the reference image layer RFn_L1V, wherein the aforementioned difference can be calculated using the mean absolute difference (MAD) or mean squared error (MSE), but the invention is not limited thereto.

In other words, the motion-estimation circuit 220A can subtract the position of the corresponding co-located block in the reference image layer RFn+1_L1V by the position of each block in the reference image layer RFn_L1V to obtain the first motion vector of each block in the reference image layer RFn_L1V. The motion-estimation circuit 220A can calculate the second motion vector corresponding to each block in the reference subtitle layer RFn_L1T in a similar manner.

Similarly, the motion-estimation circuit 220B can calculate the motion vector corresponding to each block in the reference image layer RFn_L2V and reference subtitle layer RFn_L2T. The motion-estimation circuit 220B can calculate the motion vector corresponding to each block in the reference image layer RFn_L3V and reference subtitle layer RFn_L3T.

The motion-estimation-filtering circuit 230 may be used to determine which of the motion-estimation circuits 220A, 220B, and 220C has the most accurate motion-estimation result, and may use the most accurate motion-estimation result (e.g., least motion error) as the motion-estimation result for the subsequent motion-compensated frame interpolation process. For example, when the motion-estimation circuit 220A has calculated the motion vector corresponding to each block in the reference image layer RFn_L1V and subtitle layer RFn_L1T, the motion-estimation-filtering circuit 230 may perform motion compensation on each block in the reference image layer RFn_L1V and subtitle layer RFn_L1T using the corresponding motion vector to obtain a first motion-compensated image layer and a first motion-compensated subtitle layer. The motion-estimation-filtering circuit 230 may subtract the first motion-compensated image layer and the first motion-compensated subtitle layer by the reference image layer RFn+1_L1V and reference subtitle layer RFn+1_L1T to obtain an image-layer difference image and a subtitle-layer difference image. The motion-estimation-filtering circuit 230 may calculate a first sum of absolute difference (SAD) of each pixel in the image-layer difference image and the subtitle-layer difference image as the first motion error.

In a similar manner, the motion-estimation-filtering circuit 230 may calculate a second motion error (i.e., for the motion-estimation circuit 220B) of each pixel in a second motion-compensated image-layer and a second motion-compensated subtitle layer, and calculate a third motion error (i.e., for the motion-estimation circuit 220C) of each pixel in a third motion-compensated image-layer and a third motion-compensated subtitle layer.

Afterwards, the motion-estimation-filtering circuit 230 may compare the first motion error, the second motion error, and the third motion error to determine the smallest motion error, and transmit the motion vector corresponding to each block in the reference image layer and reference subtitle layer having the smallest motion error to the motion-compensated frame-interpolation circuit 242 and the frame-interpolation-evaluation circuit 240.

In some embodiments, if the motion-estimation circuit 220A has the smallest motion error, the frame-interpolation-evaluation circuit 240 may determine whether there is motion difference between the reference image layers RFn_L1V and RFn+1_L1V, and determine whether there is motion difference between the reference subtitle layers RFn_L1T and RFn+1_L1T. For example, the frame-interpolation-evaluation circuit 240 may subtract reference image layer RFn+1_L1V and the reference subtitle layer RFn+1_L1T from the reference image layer Rn_L1V and reference subtitle layer RFn_L1T, respectively, and calculate the SAD of each pixel in the image-layer difference image and the subtitle-layer difference image for determination. In other words, because the reference RFn is composed of the reference subtitle layer RFn_L1T and reference image layer RFn_L1V, and the reference image RFn+1 is composed of reference subtitle layer RFn+1_L1T and the reference image layer RFn+1_L1V, the frame-interpolation-evaluation circuit 240 may determine whether there is motion difference between the reference images RFn and RFn+1. If the motion-estimation circuit 220B or 220C has the motion-estimation result having the smallest motion error, the frame-interpolation-evaluation circuit 240 may determine in a similar manner.

When the frame-interpolation-evaluation circuit 240 determines that there is motion difference (or the motion difference is greater than or equal to a predetermined value) between the reference images RFn and RFn+1, the frame-interpolation-evaluation circuit 240 may generate a motion-compensated frame-interpolation enable signal MCFI_EN at a high logic state. When the frame-interpolation-evaluation circuit 240 determines that there is no motion difference (or the motion difference is less than a predetermined value) between the reference images RFn and RFn+1, the frame-interpolation-evaluation circuit 240 may determine that motion-compensated frame interpolation is not need between the reference images RFn and RFn+1, and thus the motion-compensated frame-interpolation enable signal MCFI_EN generated by the frame-interpolation-evaluation circuit 240 is at a low logic state.

In addition, the frame-interpolation-evaluation circuit 240 may calculate the number M required by the motion-compensated frame interpolation between the reference images RFn and RFn+1 according to the original frame rate of the content of the input video signal (i.e., may be different from the input frame rate of the input video signal, original frame rate≤input frame rate) and the display frame rate of the output video signal, wherein the original frame rate and display frame rate can be represented by "iFrame_Rate" and "oFrame_Rate", respectively. The relationship between the original frame rate iFrame_Rate and the display frame rate oFrame_Rate should satisfy equation (2):

$$\text{iFrame\_Rate} \times (M+1) \leq \text{oFrame\_Rate} \qquad (2)$$

Figure 5A:
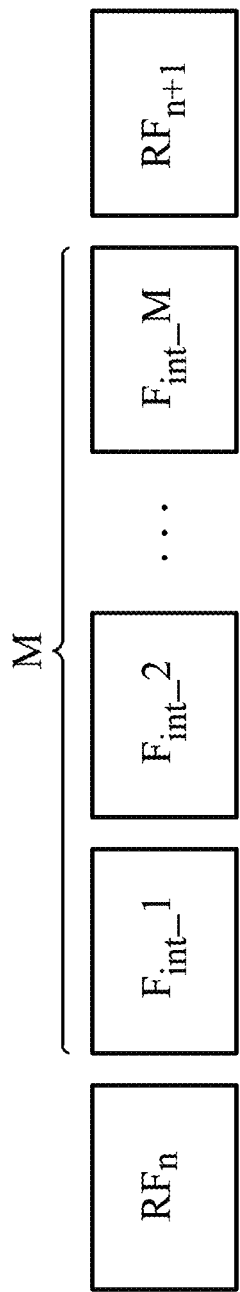
FIG. 5A is a diagram of order of images and interpolated images in accordance with an embodiment of the invention.

The frame-interpolation evaluation circuit 240 may transmit the calculated number M of images to the motion-compensated frame-interpolation circuit 250. The motion-compensated frame-interpolation circuit 250 may calculate the interpolated images Fint_1, Fint_2, . . . , Fint_M between the reference images Fn and Fn+1, as shown in FIG. 5A. For example, if the original frame rate iFrame_Rate=25 and the display frame rate oFrame_Rate=60, M is equal to 1. That is, the motion-compensated frame-interpolation circuit 250 has to calculate one interpolated images between the reference images RFn and RFn+1.

Figure 5B:
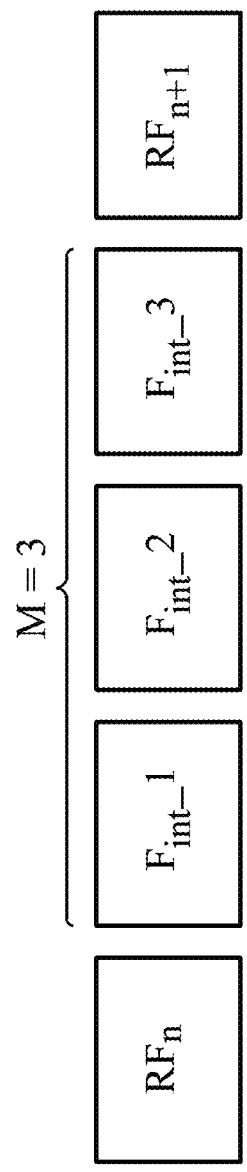
FIG. 5B is another diagram of order of images and interpolated images in accordance with an embodiment of the invention.

If the original frame rate iFrame_Rate=25 and the display frame rate oFrame_Rate=120, it indicates that the motion-compensated frame-interpolation circuit 250 has to calculate 3 interpolated images Fint_1, Fint_2, and Fint_3 between the reference images RFn and RFn+1, as shown in FIG. 5B. When the motion-compensated interpolation enable signal MCFI_EN is in the high logic state, the motion-compensated frame-interpolation circuit 250 may calculate the interpolated images Fint_1, Fint_2, and Fint_3 between the reference images RFn and RFn+1 by motion compensation. When the motion-compensated interpolation enable signal MCFI_EN is in the low logic state, it indicates that there is no motion difference between the reference images RFn and RFn_1, and thus the motion-compensated frame-interpolation circuit 250 may duplicate the reference image RFn as the interpolated images Fint_1, Fint_2, and Fint_3.

In an embodiment, when the motion-estimation-filtering circuit 230 has determined the motion vector MV for a specific block B0 from the reference image RFn to the reference image RFn+1, as shown in FIG. 5C, the motion-compensated frame-interpolation circuit 250 may calculate the motion vectors for the specific block B0 from the reference image RFn to the interpolated images Fint_1, Fint_2, and Fint_3 being 0.25 MV, 0.5 MV, and 0.75 MV, respectively. The motion vector for the specific block B0 from the reference image RFn to the interpolated image Fint_1 is shown in FIG. 5D.

In other words, if the position of the specific block B0 in the reference image RFn is RFn_B0, the position of the specific block B0 in the interpolated image Fint_1 can be expressed by equation (3):

$$\text{Fint\_1\_B0} = \text{RFn\_B0} + \frac{MV}{M+1} \qquad (3)$$

Similarly, the corresponding positions of the specific block B0 in the reference image RFn in the interpolated images Fint_2 and Fint_3 can be respectively calculated using equation (4) and equation (5):

$$\text{Fint\_2\_B0} = \text{RFn\_B0} + \frac{2 \times MV}{M+1} \qquad (4)$$

$$\text{Fint\_3\_B0} = \text{RFn\_B0} + \frac{3 \times MV}{M+1} \qquad (5)$$

Accordingly, the corresponding position of each block in the reference image RFn in the interpolated images Fint_1, Fint_2, and Fint_3 can be calculated in a similar manner.

It should be noted that the reference images RFn and RFn+1 in the aforementioned embodiments can be replaced by the reference-image layer or the reference-subtitle layer, so they are also applicable to the motion compensation of the reference-image layer and the reference-subtitle layer, respectively. The motion-compensated frame-interpolation circuit 250 may calculate the partial interpolated images in each interpolated image corresponding to the reference-image layer and reference-subtitle layer, and superimpose the partial interpolated images to obtain a complete interpolated image.

After the motion-compensated frame-interpolation circuit 250 has calculated the interpolated images Fint_1, Fint_2, . . . , Fint_M between the reference images RFn and RFn+1, the motion-compensated frame-interpolation circuit 250 may store the interpolated images Fint_1, Fint_2, . . . , Fint_M in the volatile memory 120, and determine the image output sequence in the output video signal to meet the display frame rate of the output video signal.

Specifically, after the motion-compensated frame-interpolation circuit 250 has calculated the interpolated images Fint_1, Fint_2, ..., Fint_M between the reference images RFn and RFn+1, it may still not meet the number of frames per second required by the output video signal. For example, if the original frame rate iFrame_Rate=25 and the output frame rate oFrame_Rate=120, the motion-compensated frame-interpolation circuit 250 may calculate 3 interpolated images Fint_1, Fint_2, and Fint_3 between the reference images RFn and RFn+1. In other words, the input video signal has 25 images per second, but after the motion-compensated frame-interpolation circuit 250 generates the interpolated images Fint_1, Fint_2, and Fint_3, it can only reach 100 images per second, which is not enough for the frame numbers required by the output video signal. Accordingly, when the region-based video-image-interpolation apparatus 100 generates the output video signal, the display-control circuit 260 may perform a frame-rate-conversion process to convert the input video signal into the output video signal satisfying the display frame rate.

For example, each reference image RFn in the reference image sequence has a corresponding timestamp, as shown in Table 1:

TABLE 1

| Reference image | RF0 | RF1 | RF2 | RF3 | RF4 | RF5 | RF6 | RF7 | RF8 | RF9 |
|---|---|---|---|---|---|---|---|---|---|---|
| Timestamp | RF0_t | RF1_t | RF2_t | RF3_t | RF4_t | RF5_t | RF6_t | RF7_t | RF8_t | RF9_t |
| Time (ms) | 0 | 40 | 80 | 120 | 160 | 200 | 240 | 280 | 320 | 360 |

Each of the interpolated images Fint_1 to Fint_M generated by the motion-compensated frame-interpolation circuit 250 also has a corresponding timestamp. The motion-compensated frame-interpolation circuit 250 may organize the reference images RFn in the reference image sequence and the interpolated images Fint_1 to Fint_M into a first video sequence, and assign a corresponding timestamp to each image in the first video sequence. For example, each image MFn in the first video sequence has a corresponding timestamp MFn_t. For convenience of description, if one interpolated image is added between two adjacent reference images of the reference image sequence by motion compensation, the first video sequence shown in Table 2-1 and Table 2-2 can be obtained:

TABLE 2-1

| Image | MF0 | MF1 | MF2 | MF3 | MF4 | MF5 | MF6 | MF7 | MF8 | MF9 |
|---|---|---|---|---|---|---|---|---|---|---|
| Timestamp | MF0_t | MF1_t | MF2_t | MF3_t | MF4_t | MF5_t | MF6_t | MF7_t | MF8_t | MF9_t |
| Time (ms) | 0 | 20 | 40 | 60 | 80 | 100 | 120 | 140 | 160 | 180 |

TABLE 2-2

| Image | MF10 | MF11 | MF12 | MF13 | MF14 | MF15 | MF16 | MF17 | MF18 |
|---|---|---|---|---|---|---|---|---|---|
| Timestamp | MF10_t | MF11_t | MF12_t | MF13_t | MF14_t | MF15_t | MF16_t | MF17_t | MF18_t |
| Time (ms) | 200 | 220 | 240 | 260 | 280 | 300 | 320 | 340 | 360 |

The images MF0, MF2, MF4, ..., MF18 correspond to the reference images RF0 to RF9, respectively. The images MF1, MF3, ..., MF17 are interpolated images, and their corresponding timestamps are in the middle of the timestamps of two adjacent reference images. For example, the timestamps of the reference images RF0 and RF1 (i.e., corresponding to the images MF0 and MF2) are at 0 and 40 ms, respectively. The timestamp of the interpolated image (i.e., corresponding to the image MF1) between the reference images RF0 and RF1 is in the middle of 0 and 40 ms, that is, 20 ms.

In addition, each output image OFn in the output video sequence also has a corresponding timestamp OFn_t. For convenience of description, assuming that the display frame rate is 18 ms between every two consecutive frames, the output video sequence shown in Table 3-1 and Table 3-2 can be obtained.

TABLE 3-1

| Output Image | OF0 | OF1 | OF2 | OF3 | OF4 | OF5 | OF6 | OF7 | OF8 | OF9 | OF10 |
|---|---|---|---|---|---|---|---|---|---|---|---|

TABLE 3-1-continued

| Timestamp | OF0_t | OF1_t | OF2_t | OF3_t | OF4_t | OF5_t | OF6_t | OF7_t | OF8_t | OF9_t | OF10_t |
|---|---|---|---|---|---|---|---|---|---|---|---|
| time (ms) | 0 | 18 | 36 | 54 | 72 | 90 | 108 | 126 | 144 | 162 | 180 |

TABLE 3-2

| Output Image | OF11 | OF12 | OF13 | OF14 | OF15 | OF16 | OF17 | OF18 | OF19 | OF20 |
|---|---|---|---|---|---|---|---|---|---|---|
| timestamp | OF11_t | OF12_t | OF13_t | OF14_t | OF15_t | OF16_t | OF17_t | OF18_t | OF19_t | OF20_t |
| time (ms) | 198 | 216 | 234 | 252 | 270 | 288 | 306 | 324 | 342 | 360 |

The display-control circuit 260 may perform frame rate conversion according to equation (6):

$$\begin{cases} \text{if } OFn\_t < MFm\_t, OFn = MF_{m-1} \\ \text{if } OFn\_t \geq MFm\_t, OFn = MF_m \end{cases} \quad (6)$$

where MFm_t denotes the timestamp that is closest to the output image OFn.

For example, the images MF0 to MF19 of the first video sequence are all stored in the volatile memory 120. When the playback control circuit 260 is about to generate the output image OF3, because the timestamp OF3_t of the output image OF3 corresponds to 54 ms, the display-control circuit 260 may determine that the image MF3 is closest to the output image OF3, and the timestamp OF3_t is earlier than the timestamp MF3_t of the image MF3, the display-control circuit 260 may select the image MF2 as the output image OF3. When the display-control circuit 260 is about to generate the output image OF10, because the timestamp OF10_t of the output image OF10 corresponds to 180 ms, the display-control circuit 260 may determine that the image MF9 is closest to the output image OF10 and the timestamp OF10_t is the same as the timestamp MF9_t, the display-control circuit 260 may select the image MF9 as the output image OF10. When the display-control circuit 260 is about to generate the output image OF16, because the timestamp OF16_t of the output image OF16 corresponds to 288 ms, the display-control circuit 260 may determine that the image MF14 is closest to the output image OF16 and the timestamp OF16_t is later than the timestamp MF14_t of the image MF14, the display-control circuit 260 may select the image MFF14 as the output image OF16. Accordingly, the display-control circuit 260 may obtain each regional output image of the output video sequence in a similar manner.

Figure 6:
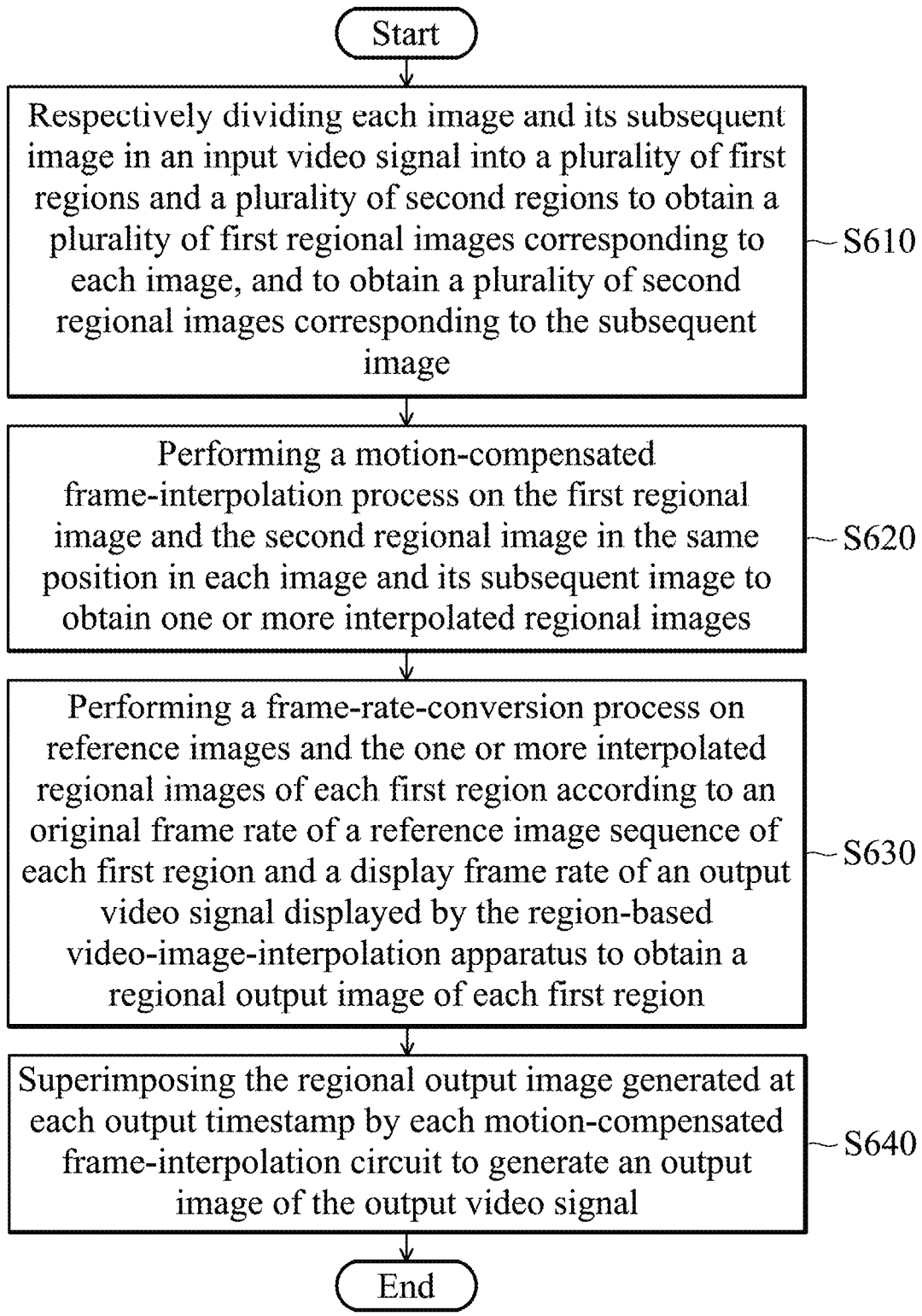
FIG. 6 is a flow chart of a method of region-based video-image interpolation in accordance with an embodiment of the invention.

FIG. 6 is a flow chart of a method of region-based video-image interpolation in accordance with an embodiment of the invention. Please refer to FIGS. 2A-2B and FIG. 6.

In step S610, each image and its subsequent image in an input video signal are respectively divided into a plurality of first regions and a plurality of second regions to obtain a plurality of first regional images corresponding to each image, and to obtain a plurality of second regional images corresponding to the subsequent image. For example, the image-region-dividing circuits 161A-161B can obtain position information of different regions in the input video signal from the system on chip (SoC) or central processing unit (CPU) of the electronic device in which the region-based video-image-interpolation apparatus 100 is disposed, such as the position information of one or more video display regions and the graphical user interface. Accordingly, the image-region-dividing circuits 161A-161B may respectively divide images Fn and Fn+1 into regional images 171A-174A and 171B-174B according to the obtained position information.

In step S620, a motion-compensated frame-interpolation process is performed on the first regional image and the second regional image in the same position in each image and its subsequent image to obtain one or more interpolated regional images. For example, the video-image-interpolation circuits 110A-110D may perform motion estimation on the regional images in the same position in images Fn and Fn+1, and perform motion compensation to calculate the one or more interpolated regional images between the regional images in the same position in images Fn and Fn+1. In addition, the video-image-interpolation circuits 110A-110D can be implemented by the video-image-interpolation circuit 110 in FIG. 2B, which is capable of performing adaptive motion-compensated frame interpolation. For example, the video-image-interpolation circuit 110 may divide each image in the input video signal into a subtitle layer and an image layer using different image-layering methods, and adaptively select the motion-estimation result with the smallest motion error for motion compensation.

In step S630, a frame-rate-conversion process is performed on reference images and the one or more interpolated regional images of each first region according to an original frame rate of a reference image sequence of each first region and a display frame rate of an output video signal displayed by the region-based video-image-interpolation apparatus 100 to obtain regional output images. For example, the original frame rate of the reference image sequence in each first region may be different from each other, the video-image-interpolation circuits 110A-110D may perform the frame-rate-conversion process on the reference images and the one or more interpolated regional images of each first region according to the original frame rate of each first region and the display frame rate of the output video signal to obtain regional output images, thereby avoiding picture jitters due to motion-compensated frame interpolation in each first region.

In step S640, the regional output image generated at each output timestamp by each motion-compensated frame-interpolation circuit is superimposed to generate an output image of the output video signal. For example, the video-image-interpolation circuits 110A-110D may generate a regional output image corresponding to each output timestamp, and thus the regional-image-synthesizing circuit 190 may superimpose each regional output image at the same output timestamp to obtain the output image at the output timestamp.

In view of the above, a region-based video-image-interpolation apparatus and a method of region-based video-image interpolation are provided, which are capable of performing a motion-compensated frame-interpolation process on different video content having different original frame rate in different regions of the input video signal, so as to solve the problem of obvious picture jitters generated by the conventional video-image-interpolation apparatus that performs motion-compensated frame interpolation on the video content having two different original frame rates. In addition, the region-based video-image-interpolation apparatus and the method of region-based video-image interpolation are also capable of performing adaptive motion-compensated frame interpolation to perform motion estimation and motion compensation on the subtitle layer and image layer of each region in the input video signal, thereby obtaining a better effect of video-image interpolation and improving the user experience.

Words such as "first", "second", and "third" are used in the scope of patent application to modify the elements in the scope of patent application, and are not used to indicate that there is an order of priority and antecedent relationship between them. Either one element precedes another element, or the chronological order when executing method steps, only used to distinguish elements with the same name.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A region-based video-image-interpolation apparatus, comprising:
    an image-region-dividing circuit, respectively dividing each image and its subsequent image in an input video signal into a plurality of first regions and a plurality of second regions to obtain a plurality of first regional images corresponding to each image, and to obtain a plurality of second regional images corresponding to the subsequent image;
    a plurality of video-image-interpolation circuits, wherein each video-image-interpolation circuit performs a motion-compensated frame-interpolation process on the first regional image and the second regional image in the same position in each image and its subsequent image to obtain one or more interpolated regional images, wherein each video-image-interpolation circuit performs a frame-rate-conversion process on reference images and the one or more interpolated regional images of each first region according to an original frame rate of a reference image sequence of each first region and a display frame rate of an output video signal displayed by the region-based video-image-interpolation apparatus to obtain a regional output image for each first region; and
    a regional-image-synthesizing circuit, superimposing the regional output image generated at each output timestamp by each motion-compensated frame-interpolation circuit to generate an output image of the output video signal.

2. The region-based video-image-interpolation apparatus as claimed in claim 1, wherein the image-region-dividing circuit obtains position information for each first region in each image of the input video signal from an electronic device in which the region-based video-image-interpolation apparatus is disposed, and the first regions comprise a graphical user interface and one or more video-display regions.

3. The region-based video-image-interpolation apparatus as claimed in claim 1, wherein the image-region-dividing circuit uses an edge-detection technique to detect frames in each image and its subsequent image in the input video signal, and determines position information for each first region in each image of the input video signal, and the first regions comprise a graphical user interface and one or more video-display regions.

4. The region-based video-image-interpolation apparatus as claimed in claim 1, wherein each video-image-interpolation circuit performs at least three image-layering processes to divide each first regional image into a first image layer and a first subtitle layer, and to divide each second regional image into a second image layer and a second subtitle layer,
    wherein each video-image-interpolation circuit obtains a reference image-layer sequence and a reference subtitle-layer sequence according to the first image layer and the first subtitle layer of each image and the second image layer and the second subtitle layer of the subsequent image that are generated by each image-layering process,
    wherein each video-image-interpolation circuit performs motion estimation respectively on the reference image-layer sequence and the reference subtitle-layer sequence that are generated in each image-layering process,
    wherein each video-image-interpolation circuit adaptively determines a first motion vector for each block in each reference-image layer of the reference image-layer sequence and a second motion vector for each block in each reference-subtitle layer of the reference subtitle-layer sequence that are generated by the motion-estimation having the smallest motion error,
    wherein each video-image-interpolation circuit performs a motion-compensation process, according to the first motion vector of each block in each reference-image layer and the second motion vector of each block in each reference-subtitle layer, to generate one or more interpolated image-layer images and one or more interpolated subtitle-layer images.

5. The region-based video-image-interpolation apparatus as claimed in claim 4, wherein each video-image-interpolation circuit superimposes the reference image-layer sequence and the reference subtitle-layer sequence to generate a plurality of reference images, and superimposes the one or more interpolated image-layer images and the one or more interpolated subtitle-layer images to generate one or more interpolated images,
    wherein each video-image-interpolation circuit performs a frame-rate-conversion process on the reference images and the interpolated images of each first region according to the original frame rate of the reference image sequence of each first region and the display frame rate of the output video signal to obtain the regional output image of each first region.

6. A method of region-based video-image interpolation comprising:
    respectively dividing each image and its subsequent image in an input video signal into a plurality of first regions and a plurality of second regions to obtain a plurality of first regional images corresponding to each image, and to obtain a plurality of second regional images corresponding to the subsequent image;

performing a motion-compensated frame-interpolation process on the first regional image and the second regional image in the same position in each image and its subsequent image to obtain one or more interpolated regional images;

performing a frame-rate-conversion process on reference images and the one or more interpolated regional images of each first region according to an original frame rate of a reference image sequence of each first region and a display frame rate of an output video signal displayed by the region-based video-image-interpolation apparatus to obtain a regional output image of each first region; and superimposing the regional output image generated at each output timestamp by each motion-compensated frame-interpolation circuit to generate an output image of the output video signal.

7. The method as claimed in claim 6, further comprising:

obtaining position information of each first region in each image of the input video signal from an electronic device in which the region-based video-image-interpolation apparatus is disposed, and the first regions comprise a graphical user interface and one or more video-display regions.

8. The method as claimed in claim 6, further comprising:

using an edge-detection technique to detect frames in each image and its subsequent image in the input video signal; and determining the position information of each first region in each image of the input video signal, and the first regions comprise a graphical user interface and one or more video-display regions.

9. The method as claimed in claim 6, further comprising:

performing at least three image-layering processes to divide each first regional image into a first image layer and a first subtitle layer, and to divide each second regional image into a second image layer and a second subtitle layer;

obtaining a reference image-layer sequence and a reference subtitle-layer sequence according to the first image layer and the first subtitle layer of each image, and the second image layer and the second subtitle layer of the subsequent image that are generated in each image-layering process;

performing motion estimation respectively on the reference image-layer sequence and the reference subtitle-layer sequence that are generated in each image-layering process;

adaptively determining a first motion vector of each block in each reference-image layer of the reference image-layer sequence and a second motion vector of each block in each reference-subtitle layer of the reference subtitle-layer sequence that are generated by the motion-estimation having the smallest motion error; and performing a motion-compensation process, according to the first motion vector of each block in each reference-image layer and the second motion vector of each block in each reference-subtitle layer, to generate one or more interpolated image-layer images and one or more interpolated subtitle-layer images.

10. The method as claimed in claim 9, further comprising:

superimposing the reference image-layer sequence and the reference subtitle-layer sequence to generate a plurality of reference images, and superimposing the one or more interpolated image-layer images and the one or more interpolated subtitle-layer images to generate one or more interpolated images; and performing a frame-rate-conversion process on the reference images and the interpolated images of each first region according to the original frame rate of the reference image sequence of each first region and the display frame rate of the output video signal to obtain the regional output image of each first region.

* * * * *